US012129854B2

(12) United States Patent
Lee et al.

(10) Patent No.: US 12,129,854 B2
(45) Date of Patent: Oct. 29, 2024

(54) COMPRESSOR

(71) Applicant: LG Electronics Inc., Seoul (KR)

(72) Inventors: Seungmock Lee, Seoul (KR); Jonghun Ha, Seoul (KR); Cheolhwan Kim, Seoul (KR); Kangwook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 17/274,037

(22) PCT Filed: Sep. 4, 2019

(86) PCT No.: PCT/KR2019/011367
§ 371 (c)(1),
(2) Date: Mar. 5, 2021

(87) PCT Pub. No.: WO2020/050605
PCT Pub. Date: Mar. 12, 2020

(65) Prior Publication Data
US 2022/0034324 A1 Feb. 3, 2022

(30) Foreign Application Priority Data
Sep. 5, 2018 (KR) ........................ 10-2018-0106087

(51) Int. Cl.
*F04C 29/06* (2006.01)
*F04C 2/02* (2006.01)
(Continued)

(52) U.S. Cl.
CPC ............ *F04C 29/061* (2013.01); *F04C 2/025* (2013.01); *F04C 23/008* (2013.01);
(Continued)

(58) Field of Classification Search
CPC .... F04C 29/061; F04C 29/065; F04C 29/066; F04C 23/008; F04C 23/025; F04C 2/025;
(Continued)

(56) References Cited

U.S. PATENT DOCUMENTS 4,781,545 A * 11/1988 Yokomizo ............. F04C 29/068 418/181
4,904,165 A * 2/1990 Fraser, Jr. ............. F04C 29/065 418/55.1
(Continued)

FOREIGN PATENT DOCUMENTS

CN 104481885 4/2015
CN 105221433 1/2016
(Continued)

OTHER PUBLICATIONS

Machine Translation of CN 206206181.*
(Continued)

*Primary Examiner* — Christopher S Bobish
(74) *Attorney, Agent, or Firm* — Fish & Richardson P.C.

(57) ABSTRACT

The present invention relates to a compressor comprising: a muffler that provides a sealed space for guiding a refrigerant; and a resonator provided in the muffler and forming cavities separate from the sealed space to decrease vibration and noise caused by the refrigerant.

18 Claims, 8 Drawing Sheets

(51) Int. Cl.
*F04C 23/00* (2006.01)
*F04C 29/12* (2006.01)

(52) U.S. Cl.
CPC .......... *F04C 29/065* (2013.01); *F04C 29/066* (2013.01); *F04C 29/12* (2013.01); *F05D 2260/963* (2013.01)

(58) Field of Classification Search
CPC ........... F05D 2260/963; F04B 39/0061; F04B 39/0066; F04B 39/0072
See application file for complete search history.

(56) References Cited

U.S. PATENT DOCUMENTS

| | | | | | |
|---|---|---|---|---|---|
| 4,990,073 | A * | 2/1991 | Kudo | F04C 29/0035 | 181/403 |
| 5,071,323 | A * | 12/1991 | Sakashita | F04C 28/16 | 417/440 |
| 5,114,322 | A * | 5/1992 | Caillat | F04C 27/005 | 418/55.6 |
| 5,219,281 | A * | 6/1993 | Caillat | F04C 27/005 | 418/55.6 |
| 5,295,813 | A * | 3/1994 | Caillat | F04C 18/0215 | 384/906 |
| 5,667,371 | A * | 9/1997 | Prenger | F04C 18/0215 | 181/403 |
| 6,220,839 | B1 * | 4/2001 | Sheridan | F04C 23/008 | 418/181 |
| 6,422,842 | B2 * | 7/2002 | Sheridan | F04C 29/068 | 418/181 |
| 6,790,019 | B1 * | 9/2004 | Hinchey, Jr. | F04C 29/122 | 418/181 |
| 6,824,365 | B2 * | 11/2004 | Park | F04B 39/0061 | 181/403 |
| 7,527,484 | B2 * | 5/2009 | Kim | F04C 29/065 | 418/94 |
| 8,246,320 | B2 * | 8/2012 | Park | F04B 39/0061 | 417/540 |
| 8,282,364 | B2 * | 10/2012 | Ogawa | F04C 18/3564 | 181/403 |
| 8,496,446 | B2 * | 7/2013 | Lai | F04C 18/0215 | 181/403 |
| 10,539,126 | B2 * | 1/2020 | Doi | F04B 39/0061 | |
| 10,731,650 | B2 * | 8/2020 | Ku | F04C 23/008 | |
| 10,774,835 | B2 * | 9/2020 | Geue | F04C 25/02 | |
| 11,306,719 | B2 * | 4/2022 | Jeon | F04C 27/001 | |
| 2004/0033151 | A1 * | 2/2004 | Shim | F04C 29/065 | 418/92 |
| 2006/0056987 | A1 * | 3/2006 | Seok | F04C 23/001 | 417/273 |
| 2008/0003123 | A1 * | 1/2008 | Byun | F04C 28/065 | 418/23 |
| 2018/0093593 | A1 * | 4/2018 | Beuschel | F04C 29/0035 | |
| 2021/0140420 | A1 * | 5/2021 | Bodain | F04B 39/10 | |
| 2022/0196017 | A1 * | 6/2022 | Lin | F04C 29/065 | |

FOREIGN PATENT DOCUMENTS

| | | | |
|---|---|---|---|
| CN | 206206181 | 5/2017 | |
| CN | 107339217 | 11/2017 | |
| DE | 10347693 | 5/2004 | |
| JP | 2015105635 | 6/2015 | |
| JP | 2018031303 | 3/2018 | |
| JP | 2018053746 | 4/2018 | |
| KR | 20130011646 | 1/2013 | |
| WO | WO-2018037906 A1 * | 3/2018 | F04B 39/00 |

OTHER PUBLICATIONS

Office Action in German Appln. No. 112019004449.4, dated Feb. 1, 2022, 8 pages (with English translation).
PCT International Search Report and Written Opinion in International Appln. No. PCT/KR2019/011367, dated Dec. 12, 2019, 6 pages (with English translation).
Office Action in Chinese Appln. No. 201980060513.2, dated May 13, 2022, 17 pages (with English translation).

* cited by examiner (a)

(b)

(a)

(b)

(a)

(b)

(a)

(b)

(c)

COMPRESSOR

CROSS-REFERENCE TO RELATED APPLICATIONS

This application is a National Stage application under 35 U.S.C. § 371 of International Application No. PCT/KR2019/011367, filed on Sep. 4, 2019, which claims the benefit of Korean Application No. 10-2018-0106087, filed on Sep. 5, 2018. The disclosures of the prior applications are incorporated by reference in their entirety.

TECHNICAL FIELD

The present disclosure relates to a compressor, and more particularly, to a compressor comprising a resonator that may counterbalance or attenuate noise and vibration generated in the compressor.

BACKGROUND ART

Generally, a compressor is an apparatus applied to a cooling cycle (hereinafter, referred to as a cooling cycle) such as a refrigerator or an air conditioner, and provides a work required for heat exchange in the cooling cycle by compressing a refrigerant.

The compressor may be categorized into a reciprocating compressor, a rotary compressor, and a scroll compressor in accordance with a method of compressing a refrigerant. The scroll compressor is a compressor configured to perform an orbiting movement by engaging an orbiting scroll with a fixed scroll fixed to an inner space of a case, and is provided with a compression chamber formed between a fixed wrap of the fixed scroll and an orbiting wrap of the orbiting scroll.

Since the scroll compressor is continuously compressed through scroll shapes engaged with each other, the scroll compressor may obtain a relatively high compression rate as compared with the other types of compressors, and may obtain a stable torque in accordance with a smooth flow of suction, compression, and discharge strokes of the refrigerant. For these reasons, the scroll compressor is widely used for refrigerant compression in an air conditioning system, etc.

A scroll compressor of the related art includes a case forming an external appearance and having a discharge outlet through which a refrigerant is discharged, a compression unit fixed to the case, compressing the refrigerant, and a driving unit fixed to the case, driving the compression unit, wherein the compression unit and the driving unit are connected with each other by a rotary shaft rotated by being coupled to the driving unit. In the scroll compressor of the related art, the rotary shaft is provided to be eccentric in a radius direction, and the orbiting scroll is fixed to the eccentric rotary shaft and provided to revolve the fixed scroll. As a result, the orbiting scroll compresses the refrigerant while revolving (orbiting) along the fixed wrap of the fixed scroll.

Meanwhile, in the scroll compressor of the related art, it is general that the compression unit is provided below the discharge outlet and the driving unit is provided below the compression unit. The rotary shaft is provided such that its one end is coupled to the compression unit and its other end is extended to be far away from the discharge outlet and then coupled to the driving unit. Therefore, in the scroll compressor of the related art, since the compression unit is provided to be closer to the discharge outlet than the driving unit (or the compression unit is provided above the driving unit), problems occur in that it is difficult to supply oil to the compression unit and a lower frame is additionally required to allow a lower portion of the driving unit to separately support the rotary shaft connected to the compression unit. Also, in the scroll compressor of the related art, since a gas power generated by compression of a refrigerant and an action point of a repulsive force supporting the gas power are not matched with each other in the compression unit, the orbiting scroll is tilted, whereby a problem occurs in that reliability is deteriorated.

In order to solve these problems, a scroll compressor (so-called lower scroll compressor) has been recently developed, in which the driving unit is provided to be close to the discharge outlet and the compression unit is arranged in the driving unit to be far away from the discharge outlet.

In the lower scroll compressor, since an end of a rotary shaft farthest spaced apart from the discharge outlet is rotatably supported in the compression unit, a lower frame may be omitted. Also, oil stored in a lower portion of a case may directly be supplied to the compression unit without passing through the driving unit, whereby lubrication of the fixed scroll and the orbiting scroll may be quickly performed. Moreover, in the lower scroll compressor, since the rotary shaft is coupled to the fixed scroll to pass through the fixed scroll, a gas power may be matched with an action point of a repulsive force on the rotary shaft, whereby tilting moment of the orbiting scroll may be removed fundamentally.

In the lower scroll compressor, since the compression unit is provided to be far away from the discharge outlet, the orbiting scroll is provided to be adjacent to the discharge outlet, and the fixed scroll is provided to be farther away from the discharge outlet than the orbiting scroll. Since the refrigerant compressed in the compression unit is discharged through the fixes scroll, the refrigerant has no option but to be discharged from the compression unit to be far away from the discharge outlet.

Therefore, the lower scroll compressor further includes a muffler coupled to the fixed scroll to be far away from the discharge outlet (for example, lower portion), guiding the refrigerant discharged from the fixed scroll to the driving unit and the discharge outlet. The muffler forms a space that may switch a direction while moving the refrigerant discharged from the compression unit.

As a result, the muffler may prevent the refrigerant discharged from the compression unit from colliding with the oil stored in the case, and may actively guide the refrigerant of high pressure to the discharge outlet.

However, a problem occurs in that noise and vibration are remarkably generated when the refrigerant discharged from the muffler moves inside the muffler or collides with the muffler.

Moreover, a problem occurs in that vibration and noise are amplified when the refrigerant discharged from the compression unit is resonant with the muffler, whereby it is not possible to make sure of reliability of the compressor.

Furthermore, when the lower scroll compressor is not provided with a separate discharge valve in a discharge hole through which the refrigerant is discharged from the fixed scroll, the refrigerant discharged to the muffler may flow backward toward the compression unit. For this reason, pressure pulsation may occur, whereby a problem occurs in that big noise and resonance occur.

DISCLOSURE

Technical Problem

An object of the present disclosure is to provide a compressor provided with a resonator that may counterbalance or attenuate noise generated inside a muffler.

Another object of the present disclosure is to provide a compressor in which a resonator may be manufactured using a space inside a muffler.

Still another object of the present disclosure is to provide a compressor that may remove noise or vibration corresponding to a specific frequency having noise or vibration which is relatively greater.

Further still another object of the present disclosure is to provide a compressor comprising a resonator that may counterbalance or attenuate noise and vibration corresponding to a resonant frequency of a muffler.

Further still another object of the present disclosure is to provide a compressor comprising a resonator that may counterbalance or attenuate noise and vibration inside a muffler even though pressure pulsation is generated as a discharge valve is not used.

Further still another object of the present disclosure is to provide a compressor comprising a resonator that may simultaneously counterbalance or attenuate noise and vibration having a plurality of frequencies.

Technical Solution

To achieve the above objects, the present disclosure provides a compressor comprising a case including a discharge outlet at one side, through which a refrigerant is discharged; a driving unit coupled to the case, rotating a rotary shaft; a compression unit coupled to the rotary shaft, compressing the refrigerant; a muffler coupled to the compression unit, providing a sealed space for guiding the refrigerant to the discharge outlet; and a resonator provided in the muffler, forming a cavity separate from the sealed space to reduce vibration and noise caused by the refrigerant.

The resonator may include a resonant cover coupled to the muffler, forming the cavity, and at least one or more resonant holes provided to counterbalance or absorb the vibration or noise by communicating the cavity with the sealed space.

The resonator may further include a partition provided to partition the cavity into at least one or more, controlling a frequency that may be counterbalanced or absorbed in the resonant hole.

The muffler may include a coupling body coupled to the compression unit, an accommodating body extended from the coupling body, forming the sealed body, and a bearing portion rotatably accommodating the rotary shaft by passing through the accommodating body. Also, the partition may include at least one partition rib extended from an outer circumferential surface of the bearing portion toward an inner circumferential surface of the accommodating body, partitioning the cavity into a plurality of cavities.

The partition rib may be provided to partition the cavity into a plurality of cavities at the same ratio, and the resonant hole may be provided to communicate at least one of the partitioned cavities with the sealed space by passing through the resonant cover.

Also, the partition rib may be provided to partition the cavity into a plurality of cavities at different ratios, and the resonant hole may be provided to communicate at least one of the partitioned cavities with the sealed space by passing through the resonant cover.

The resonant cover may detachably be coupled to the partition rib.

Meanwhile, the partition may include a separate rib partitioning the cavity on the outer circumferential surface of the bearing portion and the inner circumferential surface of the accommodating body or restricting a volume of the cavity.

The resonant hole may be provided symmetrically with the bearing portion to pass through the resonant cover.

Meanwhile, the partition may include a restricted rib spaced apart from the inner circumferential surface of the accommodating body, forming a closed curve. The resonant hole may be provided symmetrically with the rotary shaft to pass through the resonant cover.

The resonant cover may include a first resonant cover provided in parallel with a diameter direction of the accommodating body, and a second resonant cover coupled to an upper end of the first resonant cover, forming the cavity, and the resonant hole may be provided to pass through the first resonant cover.

The first resonant cover may be provided at both sides of the rotary shaft or provided symmetrically with the rotary shaft.

The second resonant cover may be coupled to the upper end of the first resonant cover provided at both sides of the rotary shaft, and may include a through hole for delivering the refrigerant to the resonant hole.

The resonator may include a guide rib provided between the first resonant cover and the rotary shaft, concentrating the refrigerant on the resonant hole.

The guide rib may be provided to accommodate at least a portion of the rotary shaft, and may include a guide hole provided to allow a portion facing the resonant hole to pass therethrough.

Advantageous Effects

The present disclosure provides a compressor provided with a resonator that may counterbalance or attenuate noise generated inside a muffler.

The present disclosure provides a compressor in which a resonator may be manufactured using a space inside a muffler.

The present disclosure provides a compressor that may remove noise or vibration corresponding to a specific frequency having noise or vibration which is relatively greater.

The present disclosure provides a compressor comprising a resonator that may counterbalance or attenuate noise and vibration corresponding to a resonant frequency of a muffler.

The present disclosure provides a compressor comprising a resonator that may counterbalance or attenuate noise and vibration inside a muffler even though pressure pulsation is generated as a discharge valve is not used.

The present disclosure provides a compressor comprising a resonator that may simultaneously counterbalance or attenuate noise and vibration having a plurality of frequencies.

BEST MODE FOR CARRYING OUT THE INVENTION

Reference will now be made in detail to the detailed embodiments of the present disclosure, examples of which are illustrated in the accompanying drawings. Wherever possible, the same reference numbers will be used throughout the drawings to refer to the same or like parts and their description will be replaced with the first description. The term of a singular expression in this specification should be understood to include a multiple expression as well as the singular expression if there is no specific definition in the context. Also, in description of the embodiment disclosed in this specification, if detailed description of elements or functions known in respect of the present disclosure is determined to make the subject matter of the present disclosure unnecessarily obscure, the detailed description will be omitted. Also, it is to be understood that the accompanying drawings are intended to easily understand the embodiment disclosed in this specification and technical spirits disclosed in this specification should not be restricted by the accompanying drawings.

Figure 1:
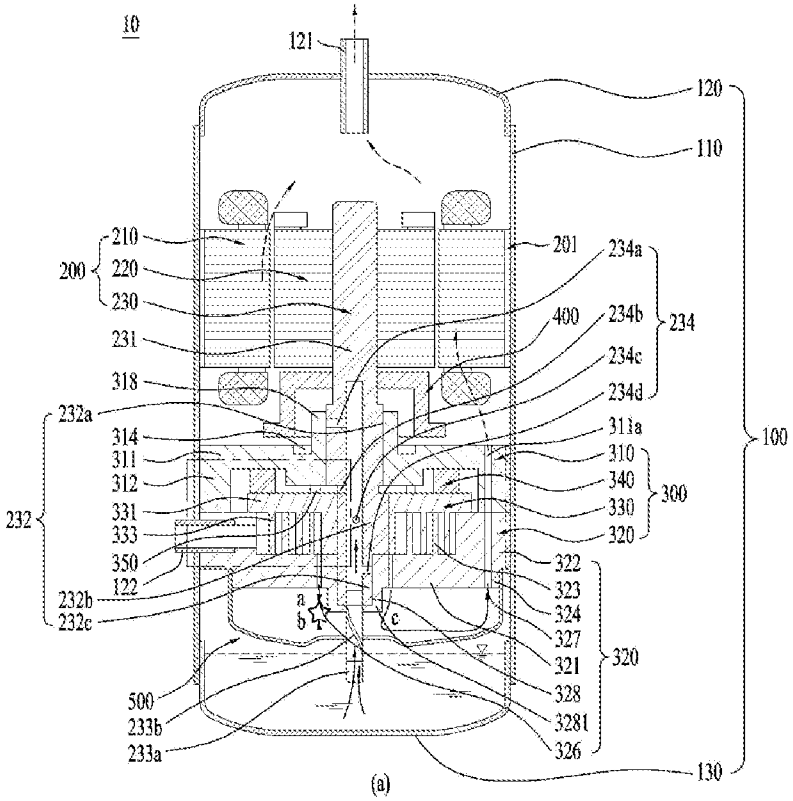
FIG. 1 illustrates a configuration of a lower scroll compressor of the present disclosure.
Figure 1:
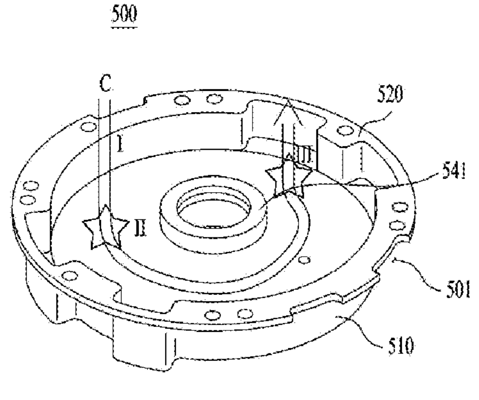

FIG. 1 illustrates a basic structure of a scroll compressor 10 according to the present disclosure.

The scroll compressor 10 of the present disclosure may include a case 100 having a space where a fluid is stored or moves, a driving unit 200 coupled to an inner circumferential surface of the case 100, rotating a rotary shaft 230, and a compression unit 300 coupled with the rotary shaft 230 in the case and provided to compress the fluid.

In detail, the case 100 may be provided with an inlet 122 through which a refrigerant enters, and a discharge outlet 121 through which the refrigerant is discharged. The case 100 may include an accommodating shell 110 provided in a cylindrical shape, accommodating the driving unit 200 and the compression unit 300 and having the inlet 122, a discharge shell 120 coupled to one end of the accommodating shell 110 and provided with the discharge outlet 121, and a shielding shell 130 coupled to the other end of the accommodating shell 110, shielding the accommodating shell 110.

The driving unit 200 includes a stator 210 generating a rotating electric field, and a rotor 220 provided to be rotated by the rotating electric field, and the rotary shaft 230 may be provided to be coupled to the rotor 220 and rotated with the rotor 220 when the rotor 220 is rotated.

The stator 210 may be provided with a plurality of slots formed on its inner circumferential surface along a circumferential direction to wind coils in the slots to generate the rotating electric field (or rotating magnetic field), and may be fixed to the inner circumferential surface of the accommodating shell 110. The rotor 220 may be fixed by inserting a plurality of magnetic bodies (permanent magnet, etc.) provided to react to the rotating electric field thereinto, and may be provided to be rotatably accommodated in the stator 210. The rotary shaft 230 may be coupled to the center of the rotor 220 by press fitting and rotated simultaneously with the rotor 220 when the rotor 220 is rotated by the rotating electric field.

The compression unit 300 may include a fixed scroll 320 fixed to the inner circumferential surface of the accommodating shell 110 and provided in the driving unit 200 to be far away from the discharge outlet 121, an orbiting scroll 330 coupled with the rotary shaft 230 and engaged with the fixed scroll 320 to form a compression chamber, and a main frame 310 mounted in the fixed scroll 330, accommodating the orbiting scroll 330.

In the scroll compressor 10 of the present disclosure, the driving unit 200 is arranged between the discharge outlet 120 and the compression unit 300. Therefore, when the discharge outlet 121 is provided above the case 100, the compression unit 300 may be provided below the driving unit 200, and the driving unit 200 may be provided between the discharge outlet 120 and the compression unit 300.

As a result, if oil is stored in the case 100, the oil may directly be supplied to the compression unit 300 without passing through the driving unit 200. Also, as the rotary shaft 230 may be supported by being coupled to the compression unit 300, a lower frame separately supporting the rotary shaft 230 may be omitted.

Also, the scroll compressor 10 of the present disclosure may be provided such that the rotary shaft 230 is in surface contact with the orbiting scroll 330 and the fixed scroll 320 by passing through the fixed scroll 320 as well as the orbiting scroll 330. For this reason, an inflow force generated when a fluid such as a refrigerant enters the compression unit 300, a gas power generated when the refrigerant is compressed in the compression unit 300 and a repulsive force supporting the gas power may act on the rotary shaft 230 at the same time. Therefore, the inflow force, the gas power and the repulsive force may be concentrated on the rotary shaft 230. As a result, since a tilting moment does not act on the orbiting scroll 330 coupled to the rotary shaft 230, the orbiting scroll may fundamentally be shielded from tilting. In other words, axial vibration from vibration generated from the orbiting scroll 330 may be attenuated or avoided, and noise and vibration problems caused by the orbiting scroll 330 may be improved.

Also, in the scroll compressor 10 of the present disclosure, a back pressure generated when the refrigerant is discharged to the outside of the compression unit 300 may be absorbed or supported by the rotary shaft 230, whereby a force (vertical force) where the orbiting scroll 330 and the fixed scroll 320 are closely attached to each other in a shaft direction may be reduced. As a result, a frictional force between the orbiting scroll 330 and the fixed scroll 320 may be reduced remarkably, whereby durability of the compression unit 300 may be improved.

Meanwhile, the main frame 310 may include a main end plate 311 provided at one side of the driving unit 200 or below the driving unit 300, a main side plate 312 extended from an inner circumferential surface of the main end plate 311 to be far away from the driving unit 200 and mounted in the fixed scroll 330, and a main bearing portion 318 extended from the main end plate 311, rotatably supporting the rotary shaft 230.

A main hole 311*a* guiding the refrigerant discharged from the fixed scroll 320 to the discharge outlet 121 may further be provided in the main end plate 311 or the main side plate 312. The main end plate 311 may further include an oil pocket 314 formed to be engraved outside the main bearing portion 318. The oil pocket 314 may be provided in a ring shape, and may be provided to be eccentric from the main bearing portion 318. The oil pocket 314 may be provided to be supplied to a portion where the fixed scroll 320 and the orbiting scroll 330 are engaged with each other, if the oil stored in the shielding shell 130 is delivered through the rotary shaft 230.

The fixed scroll 320 may include a fixed end plate 321 provided to be coupled with the accommodating shell 110 in the main end plate 311 to be far away from the driving unit 300, forming the other surface of the compression unit 300, a fixed side plate 322 extended from the fixed end plate 321 to the discharge outlet 121 and provided to be in contact with the main side plate 312, and a fixed wrap 323 provided on an inner circumferential surface of the fixed side plate 322, forming a compression chamber where the refrigerant is compressed.

Also, the fixed scroll 320 may include a fixed through hole 328 provided to allow the rotary shaft 230 to pass therethrough, and a fixed bearing portion 3281 extended from the fixed through hole 328 and supported to rotate the rotary shaft. The fixed bearing portion 3281 may be provided at the center of the fixed end plate 321.

A thickness of the fixed end plate 321 may be provided to be the same as that of the fixed bearing portion 3281. At this time, the fixed bearing portion 3281 may be provided to be inserted into the fixed through hole 328 without being extended to the fixed end plate 321.

The fixed side plate 322 may be provided with an inflow hole 325 for flowing the refrigerant into the fixed wrap 323, and the fixed end plate 321 may be provided with a discharge hole 326 through which the refrigerant is discharged. The discharge hole 326 may be provided in a center direction of the fixed wrap 323 but may be provided to be spaced apart from the fixed bearing portion 3281 to avoid interference with the fixed bearing portion 3281. Also, a plurality of discharge holes 326 may be provided.

The orbiting scroll 330 may include an orbiting end plate 331 provided between the main frame 310 and the fixed scroll 320, and an orbiting wrap 333 forming a compression chamber together with the fixed wrap 323 in the orbiting end plate. The orbiting scroll 330 may further include an orbiting through hole 338 provided to pass through the orbiting end plate 331 to allow the rotary shaft 230 to be rotatably coupled therewith.

Meanwhile, the rotary shaft 230 may be provided such that a portion coupled to the orbiting through hole 338 may be eccentric. Therefore, if the rotary shaft 230 is rotated, the orbiting scroll 330 may compress the refrigerant while moving along the fixed wrap 323 of the fixed scroll 320 by being engaged with the fixed wrap 323.

In detail, the rotary shaft 230 may include a main shaft 231 rotated by being coupled to the driving unit 200, and a bearing portion 232 connected to the main shaft 231 and rotatably coupled with the compression unit 300. The bearing portion 232 may be provided as a separate member from the main shaft 231, and therefore may be provided to accommodate the main shaft 231 therein or provided in a single body with the main shaft 231.

The bearing portion 232 may include a main bearing portion **232*a* inserted into the main bearing portion 318 of the main frame 310 and supported in a radius direction, a fixed bearing portion 232*c* inserted into the fixed bearing portion 3281 of the fixed scroll 320 and supported in a radius direction, and an eccentric shaft 232*b* provided between the main bearing portion 232*a* and the fixed bearing portion 232*c* and inserted into the orbiting through hole 338 of the orbiting scroll 330**.

At this time, the main bearing portion **232*a* and the fixed bearing portion 232*c* may be formed on the same shaft line to have the same shaft center, and the eccentric shaft 232*b* may be formed such that center of gravity is to be eccentric in a radius direction with respect to the main bearing portion 232*a* or the fixed bearing portion 232*a*. Also, an outer diameter of the eccentric portion 232*b* may be formed to be greater than that of the main bearing portion 232*a* or the fixed bearing portion 232*a*. Therefore, the eccentric shaft 232*b* may provide a force for compressing the refrigerant while orbiting the orbiting scroll 330 when the bearing portion 232 is rotated, and the orbiting scroll 330 may be provided to regularly orbit in the fixed scroll 320 in accordance with the eccentric shaft 232*b***.

However, in order to prevent the orbiting scroll 330 from rotating, the scroll compressor 10 of the present disclosure may further include an Oldham's ring 340 coupled to an upper portion of the orbiting scroll 330. The Oldham's ring 340 may be provided between the orbiting scroll 330 and the main frame 310 to be in contact with the orbiting scroll 330 and the main frame 310. The Oldham's ring 340 may be provided to perform a linear motion in four directions of forward, backward, left and right sides, whereby rotation of the orbiting scroll 330 may be avoided.

Meanwhile, the rotary shaft 230 may be provided to fully pass through the fixed scroll 320 and therefore provided to be protruded to the outside of the compression unit 300. As a result, the rotary shaft 230 may directly be in contact with the outside of the compression unit 300 and the oil stored in the shielding shell 130, and may supply the oil to the inside of the compression unit 300 by lifting the oil while rotating.

In detail, an oil supply path 234 for supplying the oil to an outer circumferential surface of the main bearing portion **232*a*, an outer circumferential surface of the fixed bearing portion 232*c*, and an outer circumferential surface of the eccentric shaft 232*b* may be formed on the outer circumferential surface of the rotary shaft 230 or inside the rotary shaft 230**.

Also, a plurality of oil holes **234*a*, 234*b*, 234*c* and 234*d* may be formed in the oil supply path 234. In detail, the oil holes may include the first oil hole 234*a*, the second oil hole 234*b*, the third oil hole 234*c* and the fourth oil hole 234*d*. First of all, the first oil hole 234*a* may be formed to pass through the outer circumferential surface of the main bearing portion 232*a***.

The first oil hole **234*a* may be formed to pass through the outer circumferential surface of the main bearing portion 232*a* in the oil supply path 234. Also, the first oil hole 234*a* may be formed to pass through, but not limited to, an upper portion of the outer circumferential surface of the main bearing portion 232*a*. That is, the first oil hole 234*a* may be formed to pass through a lower portion of the outer circumferential surface of the main bearing portion 232*a*. For reference, unlike the shown drawing, the first oil hole 234*a* may include a plurality of holes. Also, if the first oil hole 234*a* includes a plurality of holes, each hole may be formed on only the upper portion or the lower portion of the outer circumferential surface of the main bearing portion 232*a*, or may respectively be formed on the upper portion and the lower portion of the outer circumferential surface of the main bearing portion 232*a***.

Also, the rotary shaft 230 may include an oil feeder 233 provided to be in contact with the oil stored in the case 100 by passing through a muffler 500 which will be described later. The oil feeder 233 may include an extension shaft **233*a* which is in contact with the oil by passing through the muffler 500 and a screw groove 233*b* provided on an outer circumferential surface of the extension shaft 233*a* in a screw shape and communicated with the oil supply path 234**.

Therefore, if the rotary shaft 230 is rotated, the oil ascends through the oil feeder 233 and the oil supply path 234 due to viscosity of the oil and the screw groove 233*b* and a pressure difference between a high pressure area and an intermediate pressure area in the compression unit 300, and is discharged to the plurality of oil holes. The oil discharged through the plurality of oil holes 234*a*, 234*b*, 234*c* and 234*d* may not only maintain an airtight state by forming an oil film between the fixed scroll 320 and the orbiting scroll 330 but also be provided to absorb and emit friction heat generated in a frictional portion between the components of the compression unit 300.

The oil guided along the rotary shaft 230 and supplied through the first oil hole 234*a* may be provided to lubricate the main frame 310 and the rotary shaft 230. Also, the oil may be discharged through the second oil hole 234*b* and supplied to an upper surface of the orbiting scroll 330. The oil supplied to the upper surface of the orbiting scroll 330 may be guided to an intermediate pressure chamber through a pocket groove 314. For reference, the oil discharged through the first oil hole 234*a* or the third oil hole 234*c* as well as the second oil hole 234*b* may be supplied to the pocket groove 314.

Meanwhile, the oil guided along the rotary shaft 230 may be supplied to the Oldham's ring 340 provided between the orbiting scroll 330 and the main frame 230 and the fixed side plate 322 of the fixed scroll 320. As a result, abrasion of the fixed side plate 322 of the fixed scroll 320 and the Oldham's ring 340 may be reduced. Also, the oil supplied to the third oil hole 234*c* may be supplied to the compression chamber, whereby abrasion caused by friction between the orbiting scroll 330 and the fixed scroll 320 may be reduced, an oil film may be formed, and compression efficiency may be improved by heat emission.

Although a centrifugal oil supply structure for supplying oil to a bearing through rotation of the rotary shaft 230 in the scroll compressor 10 has been described as above, this structure is only exemplary. A differential pressure oil supply structure for supplying oil through a pressure difference in the compression unit 300 and a forcible oil supply structure for supplying oil through a trochoid pump may be applied to the present disclosure.

Meanwhile, the compressed refrigerant is discharged to the discharge hole 326 along a space formed by the fixed wrap 323 and the orbiting wrap 333. The discharge hole 326 may be provided toward the discharge outlet 121 more preferably. This is because that it is most preferable to deliver the refrigerant discharged from the discharge hole 326 to the discharge outlet 121 without a big change of a moving direction.

However, the discharge hole 326 is provided to spray the refrigerant in an opposite direction of the discharge outlet 121 due to structural characteristics that the compression unit 300 should be provided in the driving unit 200 to be far away from the discharge outlet 121 and the fixed scroll 320 should be provided at the outmost portion of the compression unit 300.

In other words, the discharge hole 326 is provided in the fixed end plate 321 to spray the refrigerant to be far away from the discharge outlet 121. Therefore, if the refrigerant is sprayed to the discharge hole 326 as it is, the refrigerant may not be discharged to the discharge outlet 121 smoothly, and if the oil is stored in the shielding shell 130, the refrigerant may be cooled or mixed with the oil due to collision with the oil.

To avoid this, the compressor 10 of the present disclosure may further include a muffler 500 coupled to the outmost portion of the fixed scroll 320, providing a space for guiding the refrigerant to the discharge outlet 121.

The muffler 500 may be provided to seal one surface of the fixed scroll 320, which is provided to be far away from the discharge outlet 121, whereby the refrigerant discharged from the fixed scroll 320 may be guided to the discharge outlet 121.

The muffler 500 may include a coupling body 520 coupled to the fixed scroll 320, and an accommodating body 510 extended from the coupling body 520 to form a sealed space. Therefore, the refrigerant sprayed from the discharge hole 326 may be discharged to the discharge outlet 121 by switching a moving direction along the sealed space formed by the muffler 500.

Meanwhile, since the fixed scroll 320 is provided to be coupled to the accommodating shell 110, the refrigerant may be disturbed by the fixed scroll 320 and therefore prohibited from moving to the discharge outlet 121. Therefore, the fixed scroll 320 may further include a bypass hole 327 that allows the refrigerant to pass through the fixed scroll 320 by passing through the fixed end plate 321. The bypass hole 327 may be provided to be communicated with the main hole 311*a*. As a result, the refrigerant may be discharged to the discharge hole 121 by passing through the compression unit 300 and then the driving unit 200.

Since the refrigerant is compressed at a higher pressure when moving from the outer circumferential surface of the fixed wrap 323 to the inside of the fixed wrap 323, the insides of the fixed wrap 323 and the orbiting wrap 333 are maintained at a high pressure state. Therefore, a discharge pressure acts on a rear surface of the orbiting scroll as it is, and a back pressure acts on the fixed scroll from the orbiting scroll as a reaction. The compressor 10 of the present disclosure may further include a back pressure seal 350 that prevents leakage between the orbiting wrap 333 and the fixed wrap 323 from occurring by concentrating the back pressure on a portion where the orbiting scroll 330 and the rotary shaft 230 are coupled with each other.

The back pressure seal 350 is provided in a ring shape, maintains its inner circumferential surface at a high pressure, and separates its outer circumferential surface into an intermediate pressure lower than the high pressure. Therefore, the back pressure is concentrated on the inner circumferential surface of the back pressure seal 350, whereby the orbiting scroll 330 is closely attached to the fixed scroll 320.

At this time, considering that the discharge hole 326 is spaced apart from the rotary shaft 230, the back pressure seal 350 may be provided such that its center is inclined toward the discharge hole 326. Meanwhile, the oil supplied to the compression unit 300 or the oil stored in the case 100 may move to the upper portion of the case 100 together with the refrigerant as the refrigerant is discharged to the discharge outlet 121. At this time, since the oil has density greater than that of the refrigerant, the oil is attached to inner walls of the discharge shell 110 and the accommodating shell 120 without moving to the discharge outlet 121 due to a centrifugal force generated by the rotor 220. The scroll compressor 10 may further include a recovery path F formed on outer circumferential surfaces of the driving unit 200 and the compression unit 300 to recover the oil attached to the inner wall of the case 10 to the oil storage space or the shielding shell 130 of the case 100.

The recovery path F may include a driving recovery path 201 provided on the outer circumferential surface of the driving unit 200, a compression recovery path 301 provided on the outer circumferential surface of the compression unit 300, and a muffler recovery path 501 provided on the outer circumferential surface of the muffler 500.

The driving recovery path 201 may be provided as the outer circumferential surface of the stator 210 is partially recessed, and the compression recovery path 301 may be provided as the outer circumferential surface of the fixed scroll 320 is partially recessed. Also, the muffler recovery path 501 may be provided as the outer circumferential surface of the muffler is partially recessed. The driving recovery path 201, the compression recovery path 301 and the muffler recovery path 501 may be provided to be communicated with one another, whereby the oil may pass through the paths.

Since the rotary shaft 230 is provided such that its center of gravity is inclined toward one side due to the eccentric shaft 232*b*, unbalanced eccentric moment may occur during rotation, whereby overall balance may be broken. Therefore, the scroll compressor 10 of the present disclosure may further include a balancer 400 that may counterbalance an eccentric moment that may occur due to the eccentric shaft 232*b*.

Since the compression unit 300 is fixed to the case 100, the balancer 400 is preferably coupled to the rotary shaft 230 or the rotor 220, which is provided to be rotated. Therefore, the balancer 400 may include a center balancer 420 provided on a lower end of the rotor 220 or one surface headed for the compression unit 300 to counterbalance or reduce eccentric load of the eccentric shaft 232*b*, and an outer balancer 410 coupled to an upper end of the rotor 220 or the other surface headed for the discharge outlet 121 to counterbalance eccentric load or eccentric moment of at least any one of the eccentric shaft 232*b* and the center balancer 420.

Since the center balancer 420 is provided to be relatively close to the eccentric shaft 232*b*, it is advantageous that eccentric load of the eccentric shaft 232*b* may directly be counterbalanced. Therefore, the center balancer 420 is preferably provided to be eccentric in an opposite direction of an eccentric direction of the eccentric shaft 232*b*. As a result, even though the rotary shaft 230 is rotated at low speed or high speed, since the rotary shaft 230 is close to a distance spaced apart from the eccentric shaft 232*b*, an eccentric force or eccentric load generated almost uniformly by the eccentric shaft 232*b* may be counterbalanced effectively.

The outer balancer 410 may be provided to be eccentric in an opposite direction of the eccentric direction of the eccentric shaft 232*b*. However, the outer balancer 410 may be provided to be eccentric in a direction corresponding to the eccentric shaft 232*b*, thereby partially counterbalancing eccentric load generated by the center balancer 420. As a result, the center balancer 420 and the outer balancer 410 may assist stable rotation of the rotary shaft 230 by counterbalancing the eccentric moment generated by the eccentric shaft 232*b*.

Meanwhile, referring to FIG. 1, the discharge hole 326 may be provided in a plural number.

In the original scroll compressor, the fixed wrap 323 and the orbing wrap 333 are radially extended in a logarithmic spiral shape or involute shape based on the center of the fixed scroll 320. Therefore, since the center of the fixed scroll 320 is the place having the highest pressure, it is general that the discharge hole 326 is provided at the center.

However, in the scroll compressor 10 of the present disclosure, since the rotary shaft 320 is provided to pass through the fixed end plate 321 of the fixed scroll 320, the discharge hole 326 cannot be arranged at the center of the wrap. Therefore, the scroll compressor 10 of the present disclosure may comprise discharge holes 326*a* and 326*b* on inner and outer circumferential surfaces of the center of the wrap of the orbiting scroll (see FIG. 8).

Moreover, the refrigerant may be overcompressed in the space where the discharge hole 326 is provided, during operation of low load such as partial load, whereby efficiency may be deteriorated. Therefore, unlike the shown case, a plurality of discharge holes may further be provided along the inner circumferential surface or the outer circumferential surface of the orbiting wrap (multi-stage discharging method).

At this time, the scroll compressor 10 of the present disclosure may not comprise a discharge valve for selectively shielding the plurality of discharge holes 326. This is to allow a collision sound not to be generated by collision between the discharge valve and the fixed scroll 320.

The refrigerant discharged from any one discharge hole 326 in a direction of 'a' is sprayed into the muffler 500. However, since the pressure of the refrigerant discharged into the muffler temporarily becomes high when the fixed scroll 320 has no separate discharge vale for shielding the discharge hole 326, the refrigerant may flow backward in a direction of 'b'. Particularly, when a pressure near the discharge hole 326 is temporarily reduced while the orbiting scroll 330 is orbiting, the refrigerant (direction of 'a') inside the compression chamber and the refrigerant (direction of 'b') which flows backward may directly collide with each other, and pressure pulsation may occur.

In this case, considerable impact and noise may occur in the muffler 500 and the compression unit 300, and when the pulsation is matched with a fixed frequency of the muffler 500 or the compression unit 300, resonance may occur, whereby remarkable vibration or noise may be caused.

Meanwhile, the refrigerant discharged from the discharge hole 326 may move along a direction of 'C'. That is, the refrigerant may move to the bypass hole 327 without flowing backward to the discharge hole 326. Referring to FIG. 1(*b*), the refrigerant moving in the direction of 'C' may primarily collide with the accommodating body 510 of the muffler 500 while moving in a direction of 'I', secondarily rub against the inner circumferential surface of the accommodating body 510 while moving in a direction of 'II' and thirdly provide a repulsive force to the accommodating body 510 while entering the bypass hole 327 along a direction of 'III'.

That is, vibration and noise may be generated by friction and a repulsive force while the refrigerant is being in contact with the muffler 500 primarily, secondarily and thirdly. At this time, when the frequency of the refrigerant corresponds to the resonant frequency of the muffler 500, resonance may occur, whereby considerable vibration and resonant sound may be generated.

The vibration may weaken durability of the muffler 500 and deteriorate performance of the compression unit 300. Also, the resonant sound may be spread to the outside of the compressor 10 to cause displeasure.

To this end, the scroll compressor 10 of the present disclosure may further include a resonator that may counterbalance or attenuate the noise and vibration.

Figure 2:
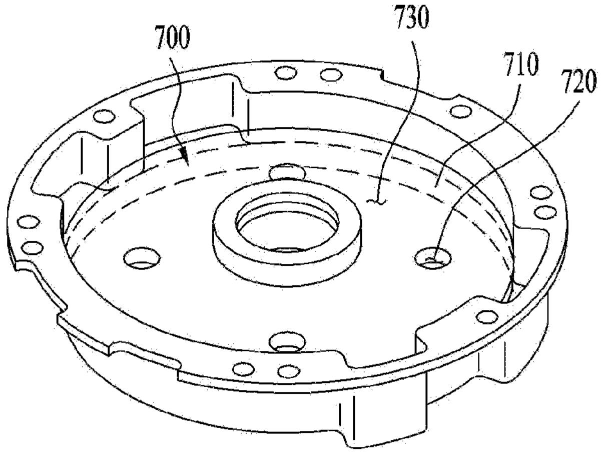
FIG. 2 illustrates a structure of a resonator provided in a lower scroll compressor of the present disclosure.
Figure 2:
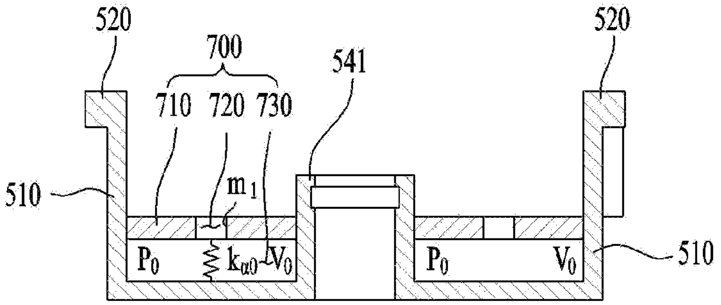

FIG. 2 illustrates a structure of a resonator provided in the compressor 10 of the present disclosure.

The resonator 700 may be provided to counterbalance or attenuate vibration and noise generated due to flow of the refrigerant.

Particularly, the resonator 700 may be provided to counterbalance or absorb vibration and noise of a specific frequency band. For example, the resonator 700 may shield resonance from occurring by counterbalancing or attenuating vibration and noise of a frequency corresponding to a natural frequency of the muffler 500 or a natural frequency of a sealed space from the vibration and noise generated by the refrigerant. Also, the resonator 700 may reduce vibration and noise by selectively attenuating or counterbalancing vibration and noise corresponding to a frequency having big vibration and noise generated by the refrigerant.

In detail, the resonator 700 of the present disclosure may be provided in the muffler 500 to form a cavity differentiated from the sealed space formed by the accommodating body 510 such that vibration or noise caused by the refrigerant may be reduced or attenuated. In other words, the scroll compressor 10 of the present disclosure may provide the resonator 700, which attenuates or counterbalances vibration and noise, through the cavity provided by a space separately partitioned in the muffler 500. That is, the resonator 700 may be provided as a Helmholtz resonator.

The resonator 700 may include a resonant cover 710 coupled to the muffler, forming the cavity, and at least one or more resonant holes 720 provided to counterbalance or absorb the vibration or noise by communicating the cavity with the sealed space S.

The resonant cover 710 is coupled to the accommodating body 510 to partition the sealed space S of the muffler 500, thereby generating the cavity. That is, the sealed space S if formed at one side of the resonant cover 710, and the cavity is formed at the other side of the resonant cover 710. The resonant cover 710 may further include a cover through hole 711 through which a muffler bearing portion 541 may pass.

The resonant hole 720 may be provided in the sealed space S and the cavity to move a fluid. At this time, when the vibration and noise generated due to the refrigerant collide with the resonator 700, the vibration and noise may provide a pressure to the cavity by passing through the resonant hole 720.

In detail, if the refrigerant collides with the resonator 700, the air corresponding to a mass ml corresponding to a volume occupied by the resonant hole 720 is attempted to enter the cavity along the resonant hole 720. Since the inside of the cavity maintains an initial pressure Po, it resists the air attempted to enter the cavity from the resonant hole 720. Therefore, the air ml located in the resonant hole 720 again moves to the sealed space ‘s’ without entering the inside, and collides with the refrigerant and then moves to the cavity. As a result, the air Vo provided in the cavity serves as a spring for buffering the air ml for vibrating the resonant hole 720.

Therefore, the air located in the resonant hole 720 serves as a rigid body of the mass m1, and the air inside the cavity serves as a spring that possesses a spring constant ko. That is, the same effect as the case that a mass-spring system is provided is obtained.

As a result, the air collected in the resonant hole 720 is vibrated in the resonant hole 720 by the mass m1, and the air vibrated in the resonant hole 720 possesses a natural frequency. At this time, if the natural frequency generated from the resonant hole 720 is matched with the natural frequency of vibration and noise generated by the refrigerant, resonance occurs. As a result, vibration amplified through the resonance is rubbed against the resonant hole 720 while reciprocating the resonant hole 720, and is converted to heat energy and then dissipated. Therefore, the vibration and noise corresponding to the frequency may be attenuated or dissipated.

Consequently, the resonator 700 of the present disclosure counterbalances noise and vibration by inversely generating noise and vibration corresponding to a specific frequency of the refrigerant and resonance in the resonant hole 720.

At this time, if the frequency counterbalanced by the resonator 700 is matched with the natural frequency of the muffler 500, resonance generated in the muffler 500 may be avoided. Also, if the frequency counterbalanced by the resonator 700 is matched with a frequency of vibration and noise having a big size, the vibration and noise may be removed selectively.

Therefore, the resonator 700 of the present disclosure may selectively attenuate and counterbalance vibration generated from the muffler 500 and the refrigerant by controlling the frequency that may be counterbalanced, and durability and reliability of the compressor may be improved.

Meanwhile, the frequency that may be attenuated by the resonator 700 of the present disclosure is computed as follows.

$$f_n = \frac{c}{2\pi}\sqrt{\frac{A}{V_0(l+l_m)}} = \frac{c}{2\pi}\sqrt{\frac{A}{V_0 l_{eq}}}$$

In this case, A is an area of the resonant hole 720, Vo is a volume of the cavity, and Leq corresponds to a thickness of the resonant hole 720. (Leq corresponds to a thickness of the resonant cover 710 in the resonator 700.)

Therefore, if the volume of the cavity formed by the resonant cover 710 and the area and thickness of the resonant hole 720 are controlled, the frequency of vibration and noise that may be counterbalanced by the resonator 700 may be determined. As a result, the compressor 10 of the present disclosure may control the resonator 700 to counterbalance or attenuate vibration and noise of a specific frequency.

For example, the scroll compressor 10 of the present disclosure may further include a partition 730 for partitioning the cavity into at least one or more cavities to control the frequency that may be counterbalanced or absorbed in the resonant hole. That is, the Vo may be controlled by the partition 730 to determine the frequency that may be counterbalanced by the resonator 700. Also, the resonant hole 720 may be disposed per area partitioned by the partition 730, and if the cavities partitioned by the partition are different from each other, vibration or noise corresponding to a plurality of frequencies may be counterbalanced simultaneously. The size of the resonant hole 720 may be controlled to control the frequency that may be counterbalanced or attenuated.

Consequently, the vibration and noise having a plurality of frequencies may be attenuated or counterbalanced simultaneously through the resonator 700 of the compressor 10 of the present disclosure.

Figure 3:
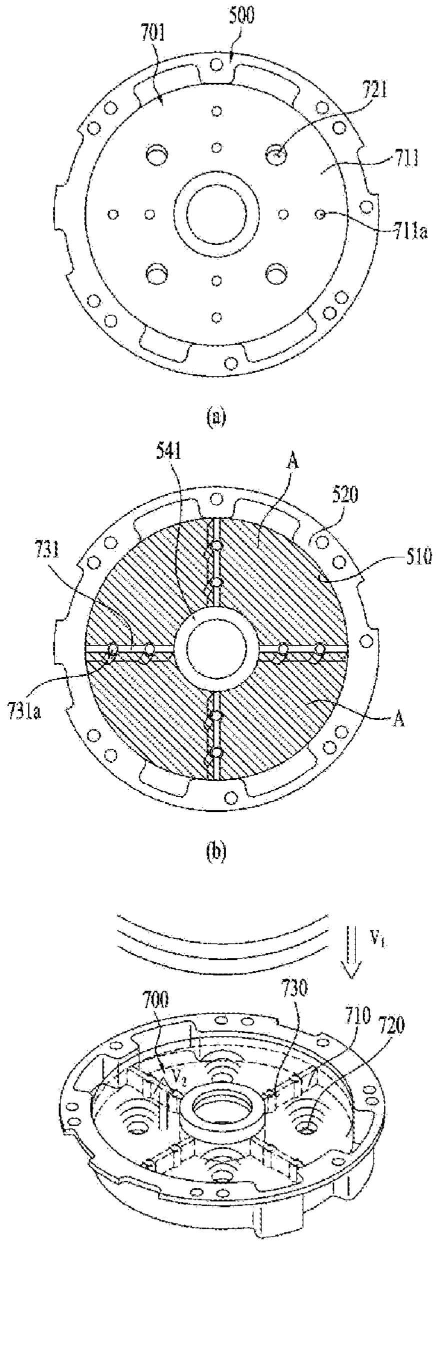
FIG. 3 illustrates an embodiment of a resonator provided in the compressor of the present disclosure.

FIG. 3 illustrates an embodiment of a resonator 700 provided in the compressor 10 of the present disclosure.

The resonator 700 provided in the compressor 10 of the present disclosure may be provided as a longitudinal resonator or a radial resonator 701, and may include a resonant cover 710, a resonant hole 720 and a partition 730.

Referring to FIGS. 3(*a*) and 3(*b*), the resonant cover 710 of the resonator of the present disclosure may include a radial cover 711 forming the cavity in the muffler 500, and the resonant hole 720 of the resonator of the present disclosure may include a radial resonant hole 721 provided to pass through the resonant cover 711. Also, the partition 730 of the resonator of the present disclosure may include at least one partition rib 731 extended from the rotary shaft 230 or an outer circumferential surface of the muffler bearing portion 541 toward the inner circumferential surface of the accommodating body 510 to partition the cavity into a plural number.

The radial resonant hole 721 may be provided to pass through the resonant cover 711 to communicate at least any one of the cavities partitioned by the partition rib 731 with the sealed space. For example, the radial resonant hole 721 may be provided in only a first space A that is one area of the cavities partitioned by the partition rib 731. At this time, vibration of a frequency corresponding to a volume of the first space A and an area corresponding to the radial resonant hole 721 may be attenuated or counterbalanced. That is, the volume of the whole cavities may be reduced by the partition rib 731, whereby the frequency may be changed.

Meanwhile, the partition rib 731 may be provided to partition the cavity formed by the radial cover 711 at the same ratio. At this time, the partition rib 731 may be provided with the radial resonant hole 721 per cavity which is partitioned. Therefore, all the radial resonant holes 721 may counterbalance vibration corresponding to the same frequency at various positions. The radial resonant hole 721 may be provided in only a portion of the cavities partitioned by the partition rib 731.

Meanwhile, unlike the shown case, the partition rib 731 may be provided to partition the cavity at different ratios. That is, the partition rib 731 may not be provided symmetrically based on the muffler bearing portion 541. At this time, the radial resonant hole 721 may be provided to pass through the resonant cover such that at least any one of the partitioned cavities may be communicated with the sealed space. Therefore, cavities having different volumes may exist, whereby vibration and noise of various frequencies may be counterbalanced or attenuated at the same time through the plurality of radial resonant holes 721.

Meanwhile, the partition rib 731 may be provided to support the radial cover 711, thereby maintaining the volume of the cavity. Also, the radial cover 711 may detachably be coupled to the partition rib 731. For example, the radial cover 711 and the partition rib 731 may be coupled with each other by a fastening member such as bolt. Therefore, the radial cover 711 may be prevented from being vibrated inside the muffler 500 separately from the muffler 500. In detail, the partition rib 731 may include a partition coupling hole 731*a* provided to be coupled with the fastening member, and the radial cover 711 may include a plurality of fastening holes 711*a* configured to guide the fastening member to be coupled with the partition coupling hole 731*a* by passing therethrough.

Therefore, the radial cover 711 may be provided in a plural number, and each of the radial covers may include a different number of radial resonant holes 721. As a result, the radial cover 711 may be replaced with another one if necessary, whereby vibration and noise to be removed may be removed intensively.

Consequently, the number of the partition ribs 731 and the number and position of the radial resonant holes 721 may be controlled to simultaneously counterbalance vibration and noise of various frequency bands generated due to the refrigerant.

Referring to FIG. 3(*c*), if the refrigerant moves to the upper portion of the radial cover 711, noise and vibration are delivered in a direction V1 parallel with the rotary shaft 230. At this time, the noise and vibration are delivered to the radial resonant hole 721 and push the air located in the radial resonant hole 721 to the cavity A. The air of the cavity counteracts on the pressure provided by the noise and vibration and again pushes the air of the radial resonant bole 721. As a result, the air located in the radial resonant hole 721 is also vibrated in a direction V2 parallel with the rotary shaft, and noise and vibration having a specific frequency and resonance occur, whereby noise and vibration corresponding to the frequency are counterbalanced. At this time, if the radial resonant hole 721 is provided in a plural number, noise and vibration of the frequency corresponding to the cavity are counterbalanced per radial resonant hole 721.

The radial resonator 701 may attenuate noise and vibration delivered in the direction V1 parallel with the rotary shaft more effectively than noise and vibration delivered in a direction vertical to the rotary shaft. Therefore, the radial resonator 701 may effectively attenuate or counterbalance noise and vibration generated when the refrigerant is discharged from the discharge hole 326 or pressure pulsation occurs due to backward flow of the refrigerant to the discharge hole 326.

Figure 4:
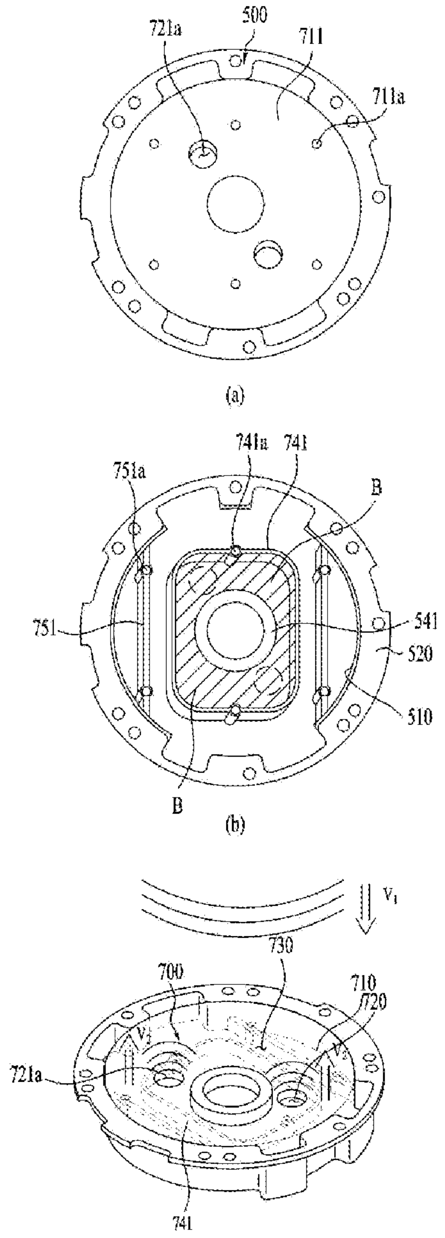
FIG. 4 illustrates another embodiment of a resonator provided in the compressor of the present disclosure.

FIG. 4 illustrates another embodiment of the longitudinal resonator 701.

Referring to FIGS. 4(*a*) and 4(*b*), the resonant cover 710 of the resonator 700 may include a resonant cover 711 forming the cavity in the muffler 500, and the resonant hole 720 of the resonator of the present disclosure may include a radial resonant hole 721 provided to pass through the radial cover 711.

Meanwhile, the partition 730 of the resonant of the present disclosure may include a restricted rib 741 spaced apart from the inner circumferential surface of the accommodating body, forming a closed curve.

The restricted rib 741 may be provided to accommodate the rotary shaft 230 or the muffler bearing portion 541, and may be provided to be spaced from the inner circumferential surface of the accommodating body 510. The restricted rib 741 may be provided in a circular shape or oval shape, or may be provided in a playground track shape.

The restricted rib 741 forms the cavity B therein. At this time, since the resonant cover 710 reduces the volume of the cavity, the restricted rib 741 may be considered to restrict the volume of the cavity. The restricted rib 741 may control a frequency of noise, which may be attenuated by the resonator 700, by controlling the volume of the cavity B.

The radial cover 711 may be provided with a plurality of radial resonant holes 721 such that the plurality of radial resonant holes 721 may share one cavity B. Therefore, noise and vibration corresponding to a specific frequency generated at various positions may be attenuated effectively.

Also, the plurality of radial resonant holes 721 may be provided symmetrically based on the rotary shaft. Therefore, a pressure applied to the cavity B may be guided to form a regular waveform. Also, the radial resonant holes 721 may be provided to have different areas. Therefore, noise and vibration corresponding to various frequencies may be attenuated at the same time by one cavity B.

Referring to FIG. 4(*c*), if the refrigerant moves to the upper portion of the radial cover 711, noise and vibration are delivered in a direction V1 parallel with the rotary shaft 230. At this time, the noise and vibration are delivered to the plurality of radial resonant holes 721 and push the air located in the radial resonant holes 721 to one cavity B. The air of the cavity counteracts on the pressure provided by the noise and vibration and again pushes the air of the radial resonant boles 721. As a result, the air located in the radial resonant holes 721 is also vibrated in a direction V2 parallel with the rotary shaft, and noise and vibration having a specific frequency and resonance occur, whereby noise and vibration corresponding to the frequency are counterbalanced.

Likewise, the resonator 700 shown in FIG. 4 may attenuate noise and vibration delivered in the direction V2 parallel with the rotary shaft more effectively than noise and vibration delivered in a direction vertical to the rotary shaft. Therefore, the resonator 700 may effectively attenuate or counterbalance noise and vibration generated when the refrigerant is discharged from the discharge hole 326 or pressure pulsation occurs due to backward flow of the refrigerant to the discharge hole 326. Also, even in the case that the discharge hole 326 is provided in a plural number, the radial resonant hole 721 may be provided in a plural number to effectively remove noise and vibration.

Figure 5:
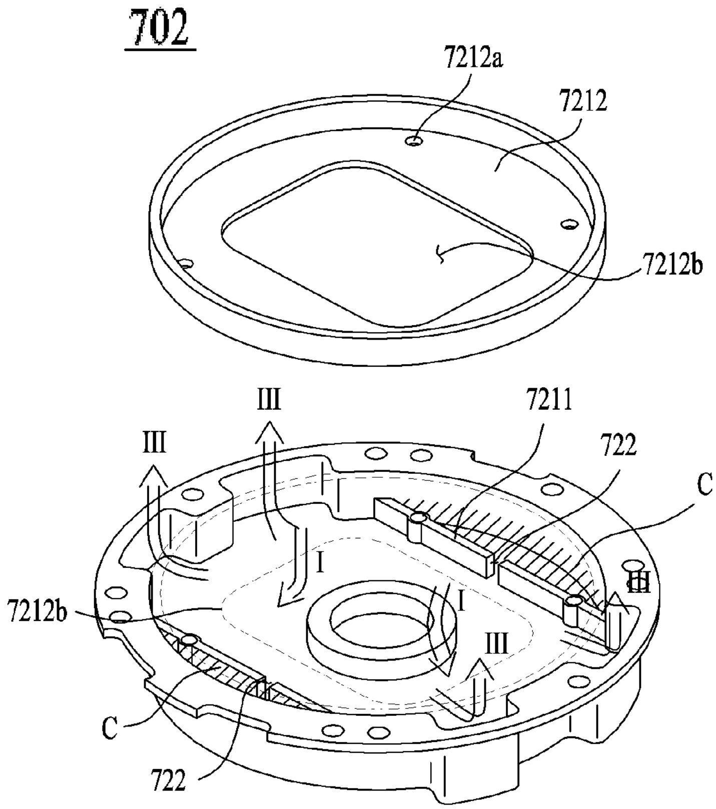
FIG. 5 illustrates still another embodiment of a resonator provided in the compressor of the present disclosure.
Figure 5:
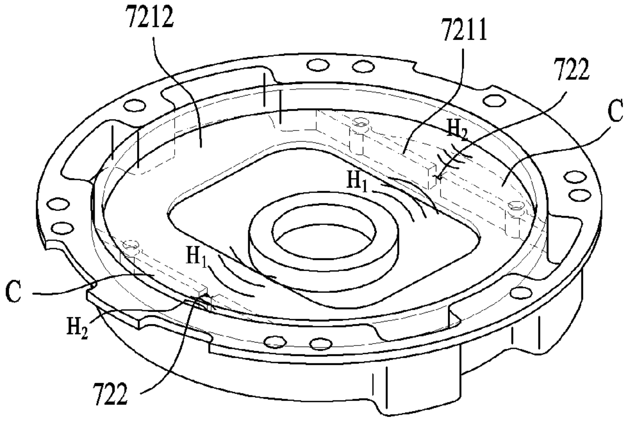

FIG. 5 illustrates still another embodiment of the resonator 700 provided in the compressor 10 of the present disclosure.

The resonator 700 provided in the compressor 10 of the present disclosure may be provided as a transverse resonator or a circumferential resonator, and may include the resonant cover 710, the resonant hole 720 and the partition 730.

The resonant cover 710 of the resonator 700 provided in the compressor 10 of the present disclosure may include a first resonant cover 7211 provided to partition an inner space of the muffler, and a second resonant cover 7212 coupled to the first resonant cover 7211, forming a cavity, and the resonant hole 720 includes a circumferential resonant hole 722 provided to pass through the first resonant cover 7211.

The first resonant cover 7211 may be provided in parallel with a diameter direction of the rotary shaft 230 or the accommodating body 510, and its both ends may be connected to the inner circumferential surface of the accommodating body 510.

The second resonant cover 7212 may be coupled to an upper end of the first resonant cover 7211 to seal a space formed by the first resonant cover 7211 and the accommodating body 510. Therefore, the first resonant cover 7211 and the inner circumferential surface of the accommodating body 510 may form a cavity C.

The second resonant cover 7212 may be provided in parallel with a base or bottom surface of the accommodating body 510.

The circumferential resonant hole 722 may be provided to pass a thickness direction of the first resonant cover 7211. At this time, the circumferential resonant hole 722 may be provided to face the rotary shaft 230 and therefore may intensively counterbalance noise or vibration vibrated in a diameter direction of the rotary shaft 230.

Meanwhile, the first resonant cover 7211 may be provided at both sides based on the rotary shaft 230. For example, the first resonant cover 7211 may be provided in parallel with the diameter direction of the rotary shaft 230 between one side of the rotary shaft and the accommodating body 510 and between the other side of the rotary shaft and the accommodating body 510.

Therefore, a plurality of cavities C may be formed by a plurality of first resonant covers 7211, and the circumferential resonant hole 722 may communicate the cavity C with the sealed space by passing through the first resonant cover 7211.

At this time, the second resonant cover 7212 may be provided in a plural number to be coupled with each of the first resonant covers 7211. However, as shown, the second resonant covers 7212 may be provided to be coupled with all of the plurality of first resonant covers 7211 to form the plurality of cavities C. Therefore, assembly of the first resonant covers 7211 and the second resonant covers 7212 may be simplified.

The second resonant cover 7212 may include a coupling hole 7212*a* that may be coupled with the first resonant cover 7211, and may include a through hole 7212*b* guiding the refrigerant discharged from the discharge hole 326 to the radial resonant hole 722. Therefore, the refrigerant may pass through the through hole 7212*b* while moving in the direction of I, and may move the bottom of the accommodating body 510 along the direction of II (see FIG. 1) and then be guided to the bypass hole 327 along the direction of III.

Referring to FIG. 5(*c*), the refrigerant pass through the front of the radial resonant hole 721*a* while moving along the above process, and the refrigerant provides a pressure to the radial resonant hole 721*a*. At this time, when vibration or noise occurs due to the refrigerant, the vibration and noise are delivered to the radial resonant hole 722 in a direction of H1. The air located in the circumferential resonant hole 722 722 enters the cavity C, and the air inside the cavity C again pushes the air of the radial resonant hole 722. At this time, the pushed air of the circumferential resonant hole 722 722 collides with the refrigerant.

As this process is repeated, the air of the circumferential resonant hole 722 722 is vibrated in a direction of H2 and generates resonance with the above frequency and the frequency of the corresponding refrigerant, whereby vibration is amplified. The amplified vibration is dissipated and removed from the circumferential resonant hole 722 722 by heat energy. Therefore, the radial resonant hole-circumferential resonant hole 722 722 may remove noise and vibration corresponding to a specific frequency from the noise and vibration generated from the refrigerant.

Since the circumferential resonant hole 722 722 is provided in the diameter direction of the rotary shaft 230, noise and vibration of the refrigerant moving along the bottom of the accommodating body 510 or moving in parallel with the bottom may be removed effectively (direction of II, see FIG. 1).

Meanwhile, the first resonant covers 7211 may be provided symmetrically based on the rotary shaft 230, and the cavities C may be provided with the same shape or the same volume. In this case, the circumferential resonant hole 722 may effectively move noise and vibration corresponding to the same frequency.

However, the first resonant covers 7211 may be provided to be spaced apart from each other at different distances based on the rotary shaft 230, and the cavities C may be provided at different shapes and volumes. In this case, each circumferential resonant hole 722 may simultaneously remove noise and vibration corresponding to different frequencies.

Figure 6:
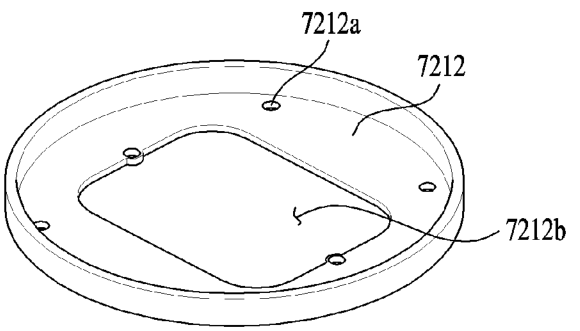
FIG. 6 illustrates a final embodiment of a resonator provided in the compressor of the present disclosure.
Figure 6:
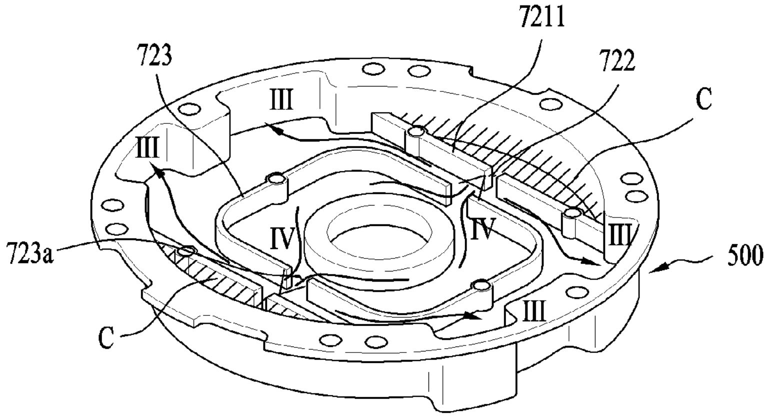
Figure 6:
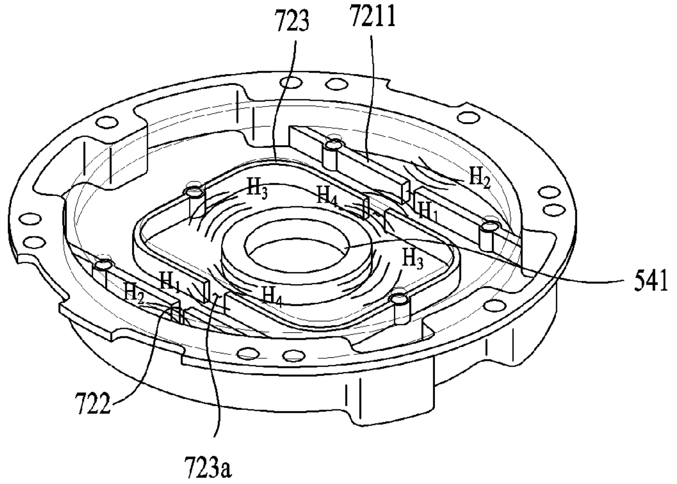

FIG. 6 illustrates a final embodiment of the resonator 700 provided in the compressor 10 of the present disclosure.

Referring to FIG. 6(*a*), the resonator 700 may additionally be provided with a guide rib 723. The guide rib 723 may be provided in a shape corresponding to the through hole 7212*b*, and may be provided to guide or concentrate the refrigerant, which has passed through the through hole, to or on the circumferential resonant hole 722.

That is, the guide rib 723 may be provided to accommodate at least a portion of the rotary shaft 230 and the bearing portion 541. At this time, the guide rib 723 may further include a guide hole 723*a* provided in a portion corresponding to or facing the resonant hole 722 to pass through the guide rib.

Therefore, the refrigerant that has passed through the through hole 7212b is concentrated on the circumferential resonant hole 722 while passing through the guide hole 723*a* along a direction of IV. Afterwards, the refrigerant moves in the direction of III after vibrating the circumferential resonant hole 722, and enters the bypass hole 327.

Referring to FIG. 6(*b*), the refrigerant absorbed in the guide rib 723 is vibrated in all directions while moving along the diameter direction of the rotary shaft 230. At this time, vibration emitted in the direction of H3 is diffracted while passing through the guide hole 723*a*. The vibration that has passed through the guide hole 723*a* collides with the circumferential resonant hole 722 in the direction of H1, and the air of the circumferential resonant hole 722 intensively counterbalances the vibration in the direction of H1 while being vibrated in the direction of H2.

As a result, noise is primarily shielded due to the guide rib 723, and noise of a specific frequency is secondarily counterbalanced or removed due to the circumferential resonant hole 722.

Figure 7:
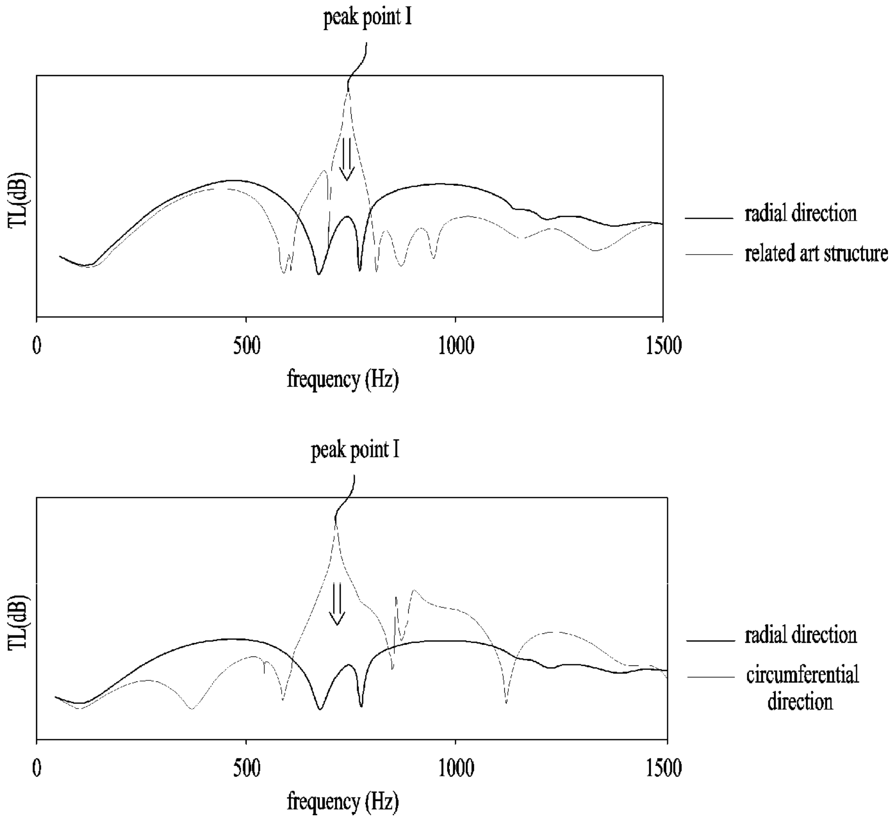
FIG. 7 illustrates an effect of a resonator provided in the compressor of the present disclosure.

FIG. 7 illustrates an effect of the resonator 700 provided in the compressor 10 of the present disclosure.

FIG. 7(*a*) illustrates that noise of a muffler of the related art is compared with noise of a muffler provided with a radial resonator, and FIG. 7(*b*) illustrates that noise of a muffler of the related art is compared with noise of a muffler provided with a circumferential resonator.

Referring to FIG. 7(*a*), in case of the muffler of the related art which is not provided with the resonator 700 (thin solid line), the refrigerant discharged between 500 hz and 1000 hz is resonated with the muffler 500, whereby an area having vibration and noise of a big size exists. This is because that the refrigerant has a frequency of a frequency band generating noise and vibration of the peak point I after the refrigerant is discharged from the discharge hole 326.

At this time, in the case that the radial resonator 701 provided with the partition 730 in a radial direction (thick line), noise corresponding to a frequency of the peak point I is dissipated by the resonator 700 and then attenuated. Therefore, vibration and noise having a small size exist in all frequency bands.

Referring to FIG. 7(*b*), in the case that the circumferential resonator 702 provided with the partition 730 in a circumferential direction (thick line), noise corresponding to a frequency of the peak point I is dissipated by the resonator 700 and then attenuated. Therefore, vibration and noise having a small size exist in all frequency bands inside the muffler. Also, a size of noise in another frequency band may be reduced due to the presence of a second resonant hole or a third resonant hole.

Therefore, the compressor 500 of the present disclosure provides the resonator 700 inside the muffler 500, whereby noise and vibration of a frequency band generating resonant noise due to resonance of the refrigerant with the muffler 500 may be attenuated or counterbalanced.

Also, the compressor 500 of the present disclosure provides the resonator 700 inside the muffler 500, whereby noise and vibration corresponding to a frequency band having big vibration or noise may be specified from the refrigerant and then attenuated or counterbalanced.

Figure 8:
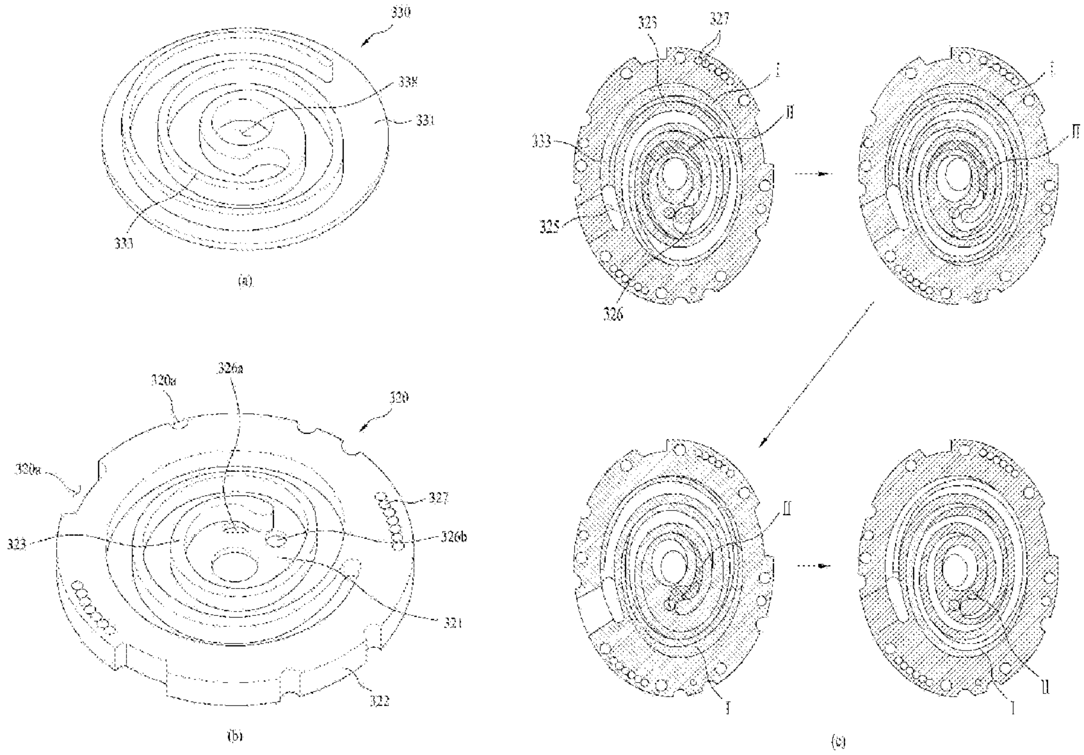
FIG. 8 illustrates an operation principle of the compressor of the present disclosure.

FIG. 8 illustrates an operation aspect of the scroll compressor 10 of the present disclosure.

FIG. 8(*a*) illustrates an orbiting scroll, FIG. 8(*b*) illustrates a fixed scroll, and FIG. 8(*c*) illustrates a process of compressing a refrigerant by the orbiting scroll and the fixed scroll.

The orbiting scroll 330 may include the orbiting wrap 333 on one surface of the orbiting end plate 331, and the fixed scroll 320 may include the fixed wrap 323 on one surface of the fixed end plate 321.

Also, the orbiting scroll 330 is provided in a sealed rigid body to prevent the refrigerant from being discharged to the outside, and the fixed scroll 320 may include an inflow hole 325 communicated with a refrigerant supply pipe to allow a refrigerant of low temperature and low pressure, such as liquid, to enter there, a discharge hole 326 through which a refrigerant of high temperature and high pressure is discharged, and a bypass hole 327 through which the refrigerant discharged from the discharge hole 326 is discharged to the outer circumferential surface.

The fixed wrap 323 and the orbiting wrap 333 are provided to be radially extended from the outside of the fixed bearing portion 3281. Therefore, in the scroll compressor 10 of the present disclosure, radiuses of the fixed wrap 323 and the orbiting wrap 333 are more extended than those of the existing scroll compressor. As a result, if the fixed wrap 323 and the orbiting wrap 333 are provided in a logarithmic spiral shape or involute shape like the existing case, since a curvature is reduced, a compression rate is reduced, and strength of the fixed wrap 323 and the orbiting wrap 333 may be weaken, whereby the fixed wrap 323 and the orbiting wrap 333 may be deformed.

Therefore, the scroll compressor 10 of the present disclosure may include the fixed wrap 323 and the orbiting wrap 333 in a plurality of arc combinations in which a curvature is continuously changed. For example, the fixed wrap 323 and the orbiting wrap 330 may be provided as hybrid wraps in which 20 or more arcs are combined.

Meanwhile, in the scroll compressor 10 of the present disclosure, the rotary shaft 230 is provided to pass through the fixed scroll 320 and the orbiting scroll 330, whereby a curvature radius and a compression space of the fixed wrap 323 and the orbiting wrap 333 are reduced.

Therefore, in order to compensate for this case, in the compressor of the present disclosure, the curvature radius just before the fixed wrap 323 and the orbiting wrap 333 are discharged may be provided to be smaller than the passed bearing portion of the rotary shaft such that the space through the refrigerant is discharged may be reduced and a compression rate may be improved. That is, the fixed wrap 323 and the orbiting wrap 333 may be provided to be more bent near the discharge hole 326, and their curvature radius may be changed per point to correspond to a portion where the fixed wrap 323 and the orbiting wrap 333 are bent to be extended to the inflow hole 325.

Referring to FIG. 8(*c*), the refrigerant I enters the inflow hole 325 of the fixed scroll 320, and the refrigerant II entering the inflow hole earlier than the refrigerant I is located near the discharge hole 326 of the fixed scroll 320.

At this time, the refrigerant I exists in an area where the fixed wrap 323 and the orbiting wrap 333 are engaged with each other on their outer surface, and the refrigerant II exists to be sealed in another area where the fixed wrap 323 and the orbiting wrap 333 are engaged with each other by two points.

Afterwards, if the orbiting scroll 330 starts to perform an orbiting movement, as the area where the fixed wrap 323 and the orbiting wrap 33 are engaged by two points moves along an extension direction of the fixed wrap 323 and the orbiting wrap 333 in accordance with a position change of the orbiting wrap 333, the volume of the refrigerant starts to be reduced, and the refrigerant I moves and starts to be compressed. The volume of the refrigerant II is more reduced and starts to be guided to the discharge hole 326.

The refrigerant II is discharged from the discharge hole 326, and the refrigerant I moves as the area where the fixed wrap 323 and the orbiting wrap 333 are engaged with each other by two points moves clockwise and its volume is reduced and starts to be more compressed.

The area where the fixed wrap 323 and the orbiting wrap 333 are engaged with each other by two points again moves clockwise and is close to the inside of the fixed scroll, and the volume of the refrigerant is more reduced and compressed, and the discharge of the refrigerant II is almost completed.

In this way, as the orbiting scroll 330 performs an orbiting movement, the refrigerant may linearly or continuously be compressed while moving inside the fixed scroll.

Although the refrigerant discontinuously enters the inflow hole 325 as shown, this is only for description and the refrigerant may be supplied continuously, and the refrigerant may be accommodated and compressed per area where the fixed wrap 323 and the orbiting wrap 333 are engaged with each other by two points.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

The invention claimed is:

1. A compressor comprising:

a case including a discharge outlet defined at one side of the case, the discharge outlet being configured to discharge a refrigerant to an outside of the case;

a rotary shaft disposed in the case;

a driving unit coupled to the case and configured to rotate the rotary shaft;

a compression unit coupled to the rotary shaft and configured to compress the refrigerant;

a muffler that is coupled to the compression unit and defines a sealed space configured to supply the refrigerant toward the discharge outlet; and a resonator disposed in the muffler, the resonator defining a cavity that is separate from the sealed space and configured to reduce vibration or noise of the compressor, wherein the resonator includes:

a resonant cover coupled to the muffler, the resonant cover defining the cavity, resonant holes defined through the resonant cover and configured to allow the vibration or noise to be communicated to the cavity, and a partition that divides the cavity into a plurality of cavities, each cavity divided by the partition being configured to counterbalance or absorb different frequencies corresponding to the vibration or noise, wherein the muffler includes:

a coupling body coupled to the compression unit, and an accommodating body that extends from the coupling body and defines the sealed space, and wherein the partition includes a partition rib that extends from an outer circumferential surface of the rotary shaft toward an inner circumferential surface of the accommodating body. the partition rib dividing the cavity into the plurality of cavities.

2. The compressor of claim 1, wherein volumes of the plurality of cavities are identical to one another, and the resonant holes communicate at least one of the plurality of cavities with the sealed space.

3. The compressor of claim 1, wherein volumes of the plurality of cavities are different from one another, and each of the resonant holes communicate at least one of the plurality of cavities with the sealed space.

4. The compressor of claim 3, wherein the resonant cover is detachably coupled to the partition rib.

5. The compressor of claim 1, wherein the resonant holes are configured to communicate the refrigerant in an axial direction of the rotary shaft.

6. The compressor of claim 1, wherein the resonant holes are configured to communicate the refrigerant in a radial direction of the rotary shaft.

7. The compressor of claim 1, wherein the resonant cover is one of a pair of first resonant covers that protrude upward relative to a bottom surface of the muffler, that extend parallel to a diameter direction of the rotary shaft, and that are spaced apart from each other, wherein the partition comprises a guide rib that protrudes upward relative to the bottom surface of the muffler, that surrounds at least a portion of a circumference of the rotary shaft, and that is disposed between the pair of first resonant covers, wherein each of the pair of first resonant covers defines a radial resonant hole configured to communicate the refrigerant in a radial direction of the rotary shaft, and wherein the guide rib defines a pair of guide holes, each guide hole facing one of the radial resonant holes.

8. The compressor of claim 1, wherein volumes of the plurality of cavities are different from one another, and the volume of each of the plurality of cavities corresponds to one of the different frequencies.

9. A compressor comprising:

a case including a discharge outlet defined at one side of the case, the discharge outlet being configured to discharge a refrigerant to an outside of the case;

a rotary shaft disposed in the case;

a driving unit coupled to the case and configured to rotate the rotary shaft;

a compression unit coupled to the rotary shaft and configured to compress the refrigerant;

a muffler that is coupled to the compression unit and defines a sealed space configured to supply the refrigerant toward the discharge outlet; and a resonator disposed in the muffler, the resonator defining a cavity that is separate from the sealed space and configured to reduce vibration or noise of the compressor, wherein the resonator includes:

a resonant cover coupled to the muffler, the resonant cover defining the cavity, resonant holes defined through the resonant cover and configured to allow the vibration or noise to be communicated to the cavity, and a partition that divides the cavity into a plurality of cavities, each cavity divided by the partition being configured to counterbalance or absorb different frequencies corresponding to the vibration or noise, wherein the muffler includes:

a coupling body coupled to the compression unit, and an accommodating body that extends from the coupling body and defines the sealed space, and wherein the partition includes a restricted rib spaced apart from an inner circumferential surface of the accommodating body, the restricted rib defining a closed curve.

10. The compressor of claim 9, wherein the resonant holes are symmetrically arranged with respect to the rotary shaft.

11. The compressor of claim 9, wherein the restricted rib surrounds the rotary shaft.

12. The compressor of claim 11, wherein the cavity is defined between the restricted rib and the rotary shaft.

13. A compressor comprising:

a case including a discharge outlet defined at one side of the case, the discharge outlet being configured to discharge a refrigerant to an outside of the case;

a rotary shaft disposed in the case;

a driving unit coupled to the case and configured to rotate the rotary shaft;

a compression unit coupled to the rotary shaft and configured to compress the refrigerant;

a muffler that is coupled to the compression unit and defines a sealed space configured to supply the refrigerant toward the discharge outlet; and a resonator disposed in the muffler, the resonator defining a cavity that is separate from the sealed space and configured to reduce vibration or noise of the compressor, wherein the resonator includes:

a resonant cover coupled to the muffler, the resonant cover defining the cavity resonant holes defined through the resonant cover and configured to allow the vibration or noise to be communicated to the cavity, and a partition that divides the cavity into a plurality of cavities, each cavity divided by the partition being configured to counterbalance or absorb different frequencies corresponding to the vibration or noise, wherein the muffler includes:

a coupling body coupled to the compression unit, and an accommodating body that extends from the coupling body and defines the sealed space, wherein the resonant cover includes:

a first resonant cover that extends parallel to a diameter direction of the accommodating body, and a second resonant cover coupled to an upper end of the first resonant cover, the second resonant defining the cavity with the first resonant cover.

14. The compressor of claim 13, wherein the first resonant cover is one of a pair of first resonance covers that are disposed at both sides of the rotary shaft.

15. The compressor of claim 13, wherein the first resonant cover is symmetrically arranged with respect to the rotary shaft.

16. The compressor of claim 13, wherein the second resonant cover is coupled to the upper end of the first resonant cover and disposed at both sides of the rotary shaft, the second resonant cover defining a through hole configured to supply the refrigerant to the resonant holes.

17. The compressor of claim 13, wherein the resonator includes a guide rib disposed between the first resonant cover and the rotary shaft, the guide rib being configured to guide the refrigerant to the resonant holes.

18. The compressor of claim 17, wherein the guide rib surrounds at least a portion of the rotary shaft, the guide rib defining a guide hole that faces the resonant holes and passes through the guide rib.

* * * * *